United States Patent [19]

Brown-Wensley et al.

[11] Patent Number: 4,952,612

[45] Date of Patent: Aug. 28, 1990

[54] ENERGY-INDUCED CURABLE COMPOSITIONS

[75] Inventors: Katherine A. Brown-Wensley, Lake Elmo; Robert J. Devoe; Michael C. Palazzotto, both of St. Paul, all of Minn.

[73] Assignee: Minnesota Mining and Manufacturing Company, St. Paul, Minn.

[21] Appl. No.: 90,791

[22] Filed: Aug. 28, 1987

[51] Int. Cl.$^5$ .................. C08G 18/22; C08G 59/68; C08G 59/72

[52] U.S. Cl. ............................. 522/25; 430/270; 430/280; 430/281; 430/283; 430/914; 430/921; 430/923; 522/170; 522/174; 522/66; 528/51; 528/52; 528/56; 528/85

[58] Field of Search ................ 522/25; 528/51, 52, 528/56

[56] References Cited

U.S. PATENT DOCUMENTS

| | | | |
|---|---|---|---|
| 3,705,129 | 12/1972 | Murio et al. | 260/47 |
| 3,709,861 | 1/1973 | Anderson | 260/47 |
| 3,714,006 | 1/1973 | Anderson | 204/159.14 |
| 3,729,313 | 4/1973 | Smith | 96/27 |
| 3,741,769 | 6/1973 | Smith | 96/35.1 |
| 3,794,576 | 2/1974 | Watt | 204/159.11 |
| 3,808,006 | 4/1974 | Smith | 96/88 |
| 3,867,354 | 2/1975 | Betts et al. | 260/78.4 |
| 4,001,015 | 1/1977 | Barzynski | 430/282 |
| 4,010,289 | 3/1977 | Kobayashi | 522/103 |
| 4,026,705 | 5/1977 | Crivello et al. | 96/27 |
| 4,053,316 | 10/1977 | Lu | 522/27 |
| 4,058,400 | 11/1977 | Crivello | 96/86 |
| 4,080,274 | 3/1978 | Schlesinger | 204/159.18 |
| 4,086,091 | 4/1978 | Cella | 96/36.2 |
| 4,113,497 | 9/1978 | Schlesinger | 522/25 |
| 4,216,288 | 8/1980 | Crivello | 430/280 |
| 4,228,232 | 10/1980 | Rousseau | 522/25 |
| 4,237,242 | 12/1980 | Frankel | 525/119 |
| 4,250,053 | 2/1981 | Smith | 252/426 |
| 4,412,048 | 10/1983 | Dixon | 522/25 |
| 4,428,807 | 1/1984 | Lee et al. | 204/159.14 |
| 4,521,545 | 6/1985 | Kerimis et al. | 521/107 |
| 4,525,232 | 6/1985 | Rooney | 522/25 |
| 4,533,446 | 8/1985 | Conway | 522/25 |
| 4,544,466 | 10/1985 | Lindstrom | 204/159.11 |
| 4,549,945 | 10/1985 | Lindstrom | 204/159.11 |
| 4,582,861 | 4/1986 | Galla et al. | 521/118 |
| 4,593,052 | 6/1986 | Irving | 522/25 |
| 4,657,779 | 4/1987 | Gaske | 522/25 |
| 4,707,432 | 11/1987 | Gatechair | 522/25 |
| 4,734,444 | 3/1988 | Henne | 522/25 |
| 4,740,577 | 4/1988 | Devoe | 528/51 |
| 4,849,320 | 7/1989 | Irving et al. | 430/280 |

FOREIGN PATENT DOCUMENTS

| | | | |
|---|---|---|---|
| 094914 | 11/1983 | European Pat. Off. | |
| 094915 | 11/1983 | European Pat. Off. | |
| 109851 | 5/1984 | European Pat. Off. | |
| 155704 | 9/1985 | European Pat. Off. | 522/25 |
| 207893 | 1/1987 | European Pat. Off. | |
| 7966 | 10/1983 | South Africa | |
| 2042550 | 9/1980 | United Kingdom | |

OTHER PUBLICATIONS

T. A. Speckhard, K. K. S. Hwang, S. B. Lin, S. Y. Isay, M. Kishiba, Y. S. Ding, S. L. Cooper; *J. Appl. Polymer Science*, 1985, 30, 647–666.

C. Bluestein; Polym.-Plast. Technol. Eng. 1981, 17 83–93.

G. Smets, *Pure G. Appl. Chem.*, 53, 611,615 (1981).

H. M. Wagner, M. D. Purbrick, *J. Photograph Science*, 29, 230–235 (1981).

J. Kosar, Light Sensitive Systems: Chemistry and Application of Nonsilver Halide Photographic Processes, Wiley, New York, 1965, pp. 158–193.

H. J. Timpe and H. Baumann, *Wiss Z. Tech, Hochsch, Leuna–Merseburg*, 26,439 (1984).

H. Baumann, B. Strehmel, H. J. Timpe and U. Lammel, *J. Prakt, Chem.*, 326 (3) 415, (1984).

H. Baumann, U. Oertel and H. J. Timpe, *Euro. Polym. J.*, 22, 313 (Apr. 3, 1986).

S. P. McManus, H. S. Bruner, H. D. Coble and G. Choudhary, J. C. S. Chem. Comm., 1974, 253.

81-30907 D/18 Derwent Abstract, May 1981.

S. P. McManus, "Stabilization of Cure Rates of Diisocyanates With Hydroxy-Terminated Polybutadiene Binders", UAH Research Report No. 140, Apr. 1973.

*Primary Examiner*—John C. Bleutge
*Assistant Examiner*—Arthur H. Koeckert
*Attorney, Agent, or Firm*—Donald M. Sell; Walter N. Kirn; Lorraine R. Sherman

[57] ABSTRACT

A polymerizable composition comprises a polymeric precursor selected from the group consisting of (1) at least one ethylenically-unsaturated monomer, (2) at least one epoxy monomer, and (3) polyurethane precursors, and a curing agent comprising an organometallic compound and an onium salt.

18 Claims, No Drawings

ENERGY-INDUCED CURABLE COMPOSITIONS

FIELD OF THE INVENTION

This invention relates to an energy-polymerizable composition comprising an ethylenically-unsaturated monomer, an epoxy monomer, or polyurethane precursors, and as curing agent a combination of an organometallic compound and an oxidizing agent and a method therefor. In another aspect, cured articles comprising the composition of the invention are disclosed. The compositions are useful, for example, as protective coatings, binders for magnetic media or abrasives, adhesives, and in graphic arts applications.

BACKGROUND OF THE INVENTION

Various polymeric coatings and articles are produced in processes involving the use of organic solvents. There is an intense effort by law makers, researchers, and industry to promote high and 100% solids formulations to reduce or eliminate the use of such solvents and the attendent costs and environmental contamination. These processes require a latent catalyst or latent reaction promoter which can be activated in a controlled fashion.

Thermal curing of polyurethane precursors using reaction promotors such as tin salts and tertiaryamines is known in the art. Curing of polymerizable mixture of polyisocyanates with polyols (referred to as polyurethane precursors) using thermally latent catalysts is known in the art (see for example U.S. Pat. Nos. 4,521,545, and 4,582,861).

Photocuring of urethane (meth)acrylates is well known (see T. A. Speckhard, K. K. S. Hwang, S. B. Lin, S. Y. Tsay, M. Koshiba, Y. S. Ding, S. L. Cooper *J. Appl. Polymer Science*, 1985, 30, 647–666. C. Bluestein Polym.-Plast. Technol. Eng. 1981, 17 83–93). Photocuring of polyurethane precursors using diazonium salts, tertiary amine precursors, and organotin compounds is also known (see U.S. Pat. Nos. 4,544,466, 4,549,945, and EP No. 28,696, Derwent abstract). All of these methods suffer from one or more of the following disadvantages: sensitivity to oxygen, requirement of ultraviolet and/or high intensity light, the need for modified resins, loss or dilution of urethane properties, low activity, poor solubility, and poor potlife.

The prior art discloses processes for the polymerization of epoxy materials. It is further known that a metallocene, such as ferrocene, can be used as a curing accelerator for epoxy materials (U.S. Pat. No. 3,705,129). U.S. Pat. Nos. 3,709,861, 3,714,006, 3,867,354 and 4,237,242 relate to the use of transition metal complexes in the reaction between polyepoxides and polyfunctional curing additives, but they do not teach the polymerization of epoxide group-containing compositions not containing a curing additive. The polymerization of epoxide group-containing materials is also known. Among such processes are those in which the polymerization catalyst is a radiation-sensitive onium salt of a Lewis acid (e.g. diazonium salts as is described in U.S. Pat. Nos. 3,794,576 and 4,080,274; halonium salts as is disclosed in U.S. Pat. No. 4,026,705; and the onium salts of Group VIA elements, particularly the sulfonium salts, as are disclosed in U.S. Pat. No. 4,058,400), or a dicarbonyl chelate compound of a Group IIIA-VA element as is disclosed in U.S. Pat. No. 4,086,091. These compositions are limited to ultraviolet radiation for polymerization. Furthermore, the dicarbonyl chelates are moisture sensitive.

U.S. Pat. No. 4,216,288 teaches the thermal curing of cationally polymerizable compositions using onium salts and reducing agents.

Energy polymerizable compositions comprising ionic salts of organometallic complex cations and cationically sensitive materials and the curing thereof has been taught (see European Pat. Nos. 109,851, 1984; 094,914, 1983 Derwent abstract; and 094,915, 1983, Derwent abstract).

Neutral organometallic compounds have been used in combination with neutral halogenated compounds for the photocuring of ethylenically-unsaturated monomers. (G. Smets, *Pure G. Appl. Chem.*, 53, 611,615 (1981); H. M. Wagner, M. D. Purbrick, *J. Photograph Science*, 29, 230–235 (1981).

The use of certain photosensitizers with onium salts for initiation of polymerization of ethylenically-unsaturated monomers is also well known in the art. This technique has found applications in printing, duplication, copying, and other imaging systems (see J. Kosar in Light Sensitive Systems: Chemistry and Application of Nonsilver Halide Photographic Processes, Wiley, New York, 1965, pp 158–193). Aryliodonium salts have been previously described for use as photoinitiators in addition polymerizable compositions. (See U.S. Pat. Nos. 3,729,313, 3,741,769, 3,808,006, 4,228,232, 4,250,053 and 4,428,807; H. J. Timpe and H. Baumann, *Wiss Z. Tech. Hochsch. Leuna-Merseburg*, 26, 439 (1984); H. Baumann, B. Strehmel, H. J. Timpe and U. Lammel, *J. Prakt. Chem.*, 326 (3), 415 (1984); and H. Baumann, U. Oertel and H. J. Timpe, *Euro. Polym. J.*, 22 (4), 313 (Apr. 3, 1986).

SUMMARY OF THE INVENTION

Briefly, the present invention provides an energy polymerizable composition comprising (1) at least one ethylenically-unsaturated monomer, (2) at least one epoxy monomer, or (3) polyurethane precursors and as curing agent a combination of a organometallic compound and an onium salt. The compositions are useful as protective and decorative coatings, inks, adhesives, in restorative and sealant applications, and in imaging applications.

What is not taught in the prior art, but what is taught in this invention, is the use of organometallic compounds in combination with onium salts for the photo- and electron beam-induced curing of ethylenically-unsaturated monomers, epoxy monomers or polyurethane precursors, and the thermal curing of ethylenically-unsaturated monomers or polyurethane precursors.

Advantages of compositions of the present invention when utilized in 100% reactive coating compositions include:

An industrial process innovation is disclosed that will reduce, minimize, or eliminate the generation of industrial solvent waste while reducing energy consumption.

Radiation processing, particularly utilizing electron beam and photogenerated catalysts, has potential capability for penetrating and polymerizing thick and pigmented coatings.

More readily available monomers can be used in place of functionalized oligomers (used in the prior art) thereby resulting in lower viscosity monomer solutions which are easier to coat than more viscous oligomer solutions.

Expanding the scope of curable monomers to include polyisocyanates/polyols and epoxides allows increased flexibility in designing coatings with specific properties. In this application:

"energy-induced curing" means curing by means of electromagnetic radiation (ultraviolet and visible) accelerated particles (including electron beam), and thermal (infrared and heat) means;

"ethylenically-unsaturated monomer" means those monomers that polymerize by a free-radical mechanism;

"catalytically-effective amount" means a quantity sufficient to effect polymerization of the curable composition to a polymerized product at least to a degree to cause an increase in the viscosity of the composition;

"organometallic compound" means a chemical substance in which at least one carbon atom of an organic group is bonded to a metal atom ("Basic Inorganic Chemistry", F. A. Cotton, G. Wilkinson, Wiley, New York, 1976, p 497);

"polyurethane precursors" means a mixture of one or more monomers of the type including diisocyanates and polyisocyanates, and one or more monomers of the type including diols and polyols. Compounds bearing at least two isocyanate-reactive hydrogen atoms may be substituted for diols and polyols; the ratio of isocyanate groups to isocyanate-reactive hydrogen atoms is 1:2 to 2:1;

"bridging ligand" means a ligand that bonds to two or more metals in the presence or absence of metal-metal bonds;

"polyisocyanate" means an aliphatic or aromatic isocyanate having 2 or more isocyanate groups;

"polyol" means an aliphatic or aromatic compound containing 2 or more hydroxyl groups; and "onium salt" means salts of cationic compounds such as diazonium, halonium, and hypervalent Group VIA elements;

An energy polymerizable mixture comprising an ethylenically-unsaturated monomer and either polyurethane precursors or an epoxy compounds, and as curing agent, an organometallic compound and an onium salt is disclosed in assignee's copending patent application U.S. Ser. No. 90,694, filed Aug. 28, 1987, filed the same date as this application.

DETAILED DISCLOSURE OF THE INVENTION

The present invention provides, in a preferred embodiment, a photopolymerizable composition comprising at least one ethylenically-unsaturated monomer, at least one epoxy monomer, or polyurethane precursors and a bicomponent curing agent therefore, and in a second embodiment a thermally polymerizable composition comprising at least one ethylenically-unsaturated monomer or polyurethane precursors and a bicomponent curing agent therefor, the curing agent in all cases comprising (1) an organometallic compound having the structure $$L^1 L^2 L^3 M$$

wherein $L^1$ represents none or 1 to 12 ligands contributing pi-electrons that can be the same or different selected from substituted and unsubstituted acyclic and cyclic unsaturated compounds and groups and substituted and unsubstituted carbocyclic aromatic and heterocyclic aromatic compounds, each capable of contributing 2 to 24 pi-electrons to the valence shell of M;

$L^2$ represents none, or 1 to 24 ligands that can be the same or different contributing an even number of sigma-electrons selected from mono-, di-, and tri-dentate ligands, each donating 2, 4, or 6 sigma-electrons to the valence shell of M;

$L^3$ represents none, 1 to 12 ligands that can be the same or different, each contributing no more than one sigma-electron each to the valence shell of each M;

M represents 1 to 4 of the same or different metal atoms selected from the elements of Periodic Groups IVB, VB, VIB, VIIB, and VIIIB (commonly referred to as transition metals); with the proviso that said organometallic compounds contains at least one of a metal-metal sigma bond and $L^3$; and with the proviso that $L^1$, $L^2$, $L^3$, and M are chosen so as to achieve a stable configuration; and (2) an onium salt oxidizing agent having the structure:

$$AX \qquad \text{II}$$

wherein

A is an organic cation selected from those described in U.S. Pat. Nos. 3,708,296, 3,729,313, 3,741,769, 3,794,576, 3,808,006, 4,026,705, 4,058,401, 4,069,055, 4,101,513, 4,216,288, 4,394,403, and 4,623,676, all incorporated herein by reference, preferably selected from diazonium, iodonium, and sulfonium cations, more preferably A is selected from diphenyliodonium, triphenylsulfonium and phenylthiophenyl diphenylsulfonium; and X is an anion, the counterion of the onium salts including those in which X is an organic sulfonate, or halogenated metal or metalloid, such as are $CH_3SO_3^-$, $CF_3SO_3^-$, $C_6H_5SO_3^-$, p-toluenesulfonate, p-chlorobenzenesulfonate and related isomers and the like, and those in which X has the formula $DZr$, wherein D is a metal from Groups IB to VIIIB or a metal or metalloid from Groups IIIA to VA of the Periodic Chart of Elements, Z is a halogen atom, and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorous. Preferably, the halogen, Z, is chlorine or fluorine. Illustrative of suitable anions are $BF_4^-$, $PF_6^-$, $AsF_6^-$, $SbF_6^-$, $FeCl_4^-$, $SnCl_5^-$, $SbF_5^-$, $AlF_6^-$, $GaCl_4^-$, $InF_4^-$, $TiF_6^-$, etc. Preferably, the anions are $CV_3SO_3^-$, $BF_4^-$, $PF_6^-$, $SbF_6^-$, $SbF_5OH^-$, $AsF_6^-$, and $SbCl_6^-$.

The curing agent can be present in the range of 0.1 to 20, preferably 0.1 to 10 weight percent of the total composition. The ratio of organometallic compound to onium salt is in the range of 10:1 to 1:10 by weight, preferably 5:1 to 1:5 by weight.

The present invention also provides a process for the polymerization of ethylenically-unsaturated monomers, epoxy monomers, or polyurethane precursors comprising the steps of:

(a) providing said at least one ethylenically-unsaturated monomers, said at least one epoxy compound or polyurethane precursors, (b) adding to said compound a combination of a catalytically effective amount of a curing agent comprising an organometallic compound and an onium salt (and all permutations of the order of mixing the aforementioned components), thereby forming a polymerizable mixture, and (c) allowing the mixture to polymerizer or adding energy to the mixture to effect polymerization.

In a further aspect, there provided a method for preparing coated articles containing the cured composition of the invention comprising the steps of:

(a) providing a substrate, (b) coating an energy polymerizable mixture as described above onto at least one surface of said substrate by methods known in the art, such as bar, knife, reverse roll, knurled roll, or spin coatings, or by dipping, spraying, brushing, and the like, with or without a coating solvent, and (c) applying energy (after evaporation of solvent if present) to the article to cause the polymerization of the coating.

In a still further aspect, there are also provided shaped articles comprising the polymerizable mixture of the invention. The articles can be provided, for example, by techniques such as molding, injection molding, casting, and extrusion. Applying energy to the mixture causes polymerization and provides the cured shaped article.

It may be desirable to add solvent to solubilize components and aid in processing. Solvent, preferably organic solvent, in an amount up to 99 weight percent, but preferably in the range of 0 to 90 weight percent, most preferably in the range of 0 to 75 weight percent, of the polymerizable composition can be used.

There are restrictions on the total sum of electrons donated by the ligands, $L^1$, $L^2$, $L^3$ of formula I and the valence electrons possessed by the metal. For most organometallic compounds not involving intramolecular metal-metal bonding, this sum is governed by the "eighteen electron rule" [see *J. Chem. Ed.*, 46, 811 (1969)]. This rule is sometimes called the "nine orbital rule", "the effective number rule", or the "rare gas rule". This rule states that the most stable organometallic compounds tend to be those compounds in which the sum of the electrons donated by the ligands and the metal is eighteen. Those skilled in the art, however, know that there are exceptions to this rule and that organometallic compounds having a sum of 16, 17, 19, and 20 electrons are also known. Therefore, organometallic compounds not including intramolecular metal-metal bonding are described by formula I, in which complexed metals having a total sum of 16, 17, 18, 19, or 20 electrons in the valence shell are included within the scope of the invention.

For compounds described in formula I in which intramolecular metal-metal bonding exists, serious departure from the "eighteen electron rule" can occur. It has been proposed [J. Amer. Chem. Soc. 100, 5305 (1978)] that the departure from the "eighteen electron rule" in these transition metal compounds is due to the metal-metal interactions destabilizing the metal p orbitals to an extent to cause them to be unavailable for ligand bonding. Hence, rather than count electrons around each metal separately in a metal cluster, cluster valence electrons (CVE) are counted. A dinuclear compound is seen to have 34 CVEs, a trinuclear compound 48 CVEs, and a tetranuclear compound having tetrahedron, butterfly, and square planar geometry is seen to have 60, 62, or 64 CVEs, respectively. Those skilled in the art, however, know that there are exceptions to this electron counting method and that organometallic cluster compounds having a sum of 42, 44, 46, 50 CVEs for a trinuclear compound and 58 CVEs for a tetranuclear compound are also known. Therefore, di, tri, or tetranuclear organometallic compounds are described by formula I in which the complexed metal cluster, MM, MMM, or MMMM has a total sum of 34; 42, 44, 46, 48, 50; or 58, 60, 62, 64 CVEs in the valence shell, respectively, and are included within the scope of this invention.

Illustrative examples of organometallic compounds according to formula I include:

$[CpFe(CO)_2]_2$
$Mn_2(CO)_{10}$
$[CpMo(CO)_3]_2$
$[CpW(CO)_3]_2$
$Re_2(CO)_{10}$
$Co_4(CO)_{12}$
$Co_2(CO)_8$
$CpFe(CO)_2SnPh_3$
$CpFe(CO)_2GePh_3$
$[CpFe(CO)_2]_2SnPh_2$
$CpMo(CO)_3SnPh_3$
$(CO)_5MnSnPh_3$
$[(CO)_5Mn]_2SnPh_2$
$CpFe(CO)_2PbPh_3$
$(CO)_5MnPbPh_3$
$(CO)_5ReSnPh_3$
$CpPtMe_3$
$CpW(CO)_3Me$
$Cp(CO)_3W-Mo(CO)_3Cp$
$Cp(CO)_3Mo-Mn(CO)_5$
$Cp(CO)_3Mo-Re(CO)_5$
$(CO)_5Mn-Fe(CO)_2Cp$
$Cp(CO)_3W-Mn(CO)_5$
$Cp(CO)_3W-Re(CO)_5$
$Cp(CO)_3Mo-Co(CO)_4$
$Cp(CO)_3W-Co(CO)_4$
$Cp(CO)_3Mo-Fe(CO)_2Cp$
$Cp(CO)_3W-Fe(CO)_2Cp$
$[CpMo(CO)_2PPh_3]_2$
$Mn_2(CO)_9PPh_3$
$Mn_2(CO)_8(PPh_3)_2$
$(CO)_5Mn-Re(CO)_5$
$[CpFe(CO)_2]_4Si$
$Mn_2(CO)_8(1,10$-phenanthroline$)$
$Re_2(CO)_8(1,10$-phenanthroline$)$
$Re_2(CO)_8(2,2'$-biquinoline$)$
$Fe_3(CO)_{12}$
$Ru_3(CO)_{12}$
$Os_3(CO)_{12}$
$Ru_3(CO)_{11}PPh_3$
$Ru_3(CO)_{10}(Ph_2P-CH_2CH_2-PPh_2)$
$Fe_2Ru(CO)_{12}$
$Ir_4(CO)_{12}$
$[CpNi(CO)]_2$
$CpFe(CO)_2CH_2Ph$
$CpFe(CO)_2(COPh)$
$CpFe(CO)_2(SiPh_3)$
$[Cp^* Fe(CO)_2]_2$
$Cp(CO)_2Fe-Fe(CO)(PPh_3)Cp$
$(MeCp)PtMe_3$
$(Me_3SiCp)PtMe_3$
$Cp(CO)_3Mo-Mo(CO)_2(PPh_3)Cp$
wherein
Me is methyl
Ph is phenyl
Cp is eta$^5$-cyclopentadienyl Cp* is eta⁵-pentamethylcyclopentadienyl A wide variety of monomers can be energy polymerized using the curing agent of the invention. Suitable compounds containing at least one ethylenically-unsaturated double bond, can be monomers and/or oligomers such as (meth)acrylates, (meth)acrylamides, and vinyl compounds, and are capable of undergoing addition polymerization. Such monomers include mono-, di-, or polyacrylates and methacrylates such as methyl acrylate, methyl methacrylate, ethyl acyrate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyl-dimethylmethane, tris-hydroxyethylisocyanurate trimethacrylate; the bis-acrylates and bis-methacrylates of polyethylene glycols of molecular weight 200-500, copolymerizable mixtures of acrylated monomers such as those of U.S. Pat. No. 4,652,274, and acrylated oligomers such as those of U.S. Pat. No. 4,642,126; unsaturated amides such as acrylamide, methylene bis-acrylamide, methylene bis-methacrylamide, 1,6-hexamethylene bis-acrylamide, diethylene triamine tris-acrylamide and beta-methacrylaminoethyl methacrylate; and vinyl compounds such as styrene, divinylbenzene, diallyl phthalate, divinyl succinate, divinyl adipate, divinyl phthalate, and vinyl azlactones as disclosed in U.S. Pat. No. 4,304,705. Mixtures of two or more monomers can be used if desired.

The polyisocyanate component of the polyurethane precursors that can be cured or polymerized in the dual curing systems of the present invention may be any aliphatic, cycloaliphatic, araliphatic, aromatic, or heterocyclic polyisocyanate, or any combination of such polyisocyanates. Particularly suitable polyisocyanates correspond to the formula

Q(NCO)$_p$   III in which p is an integer 2 to 4, and Q represents an aliphatic hydrocarbon di-, tri-, or tetra-radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 5 to 15 carbon atoms and zero to 10 heteroatoms, or an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Examples of polyisocyanates are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (see German Auslegeschrift No. 1,202,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4,- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and-/or -4,4'-diisocyanate, naphthylene-1,5-diisocyanate, and the reaction products of four equivalents of the aforementioned isocyanate-containing compounds with compounds containing two isocyanate-reactive groups.

According to the present invention, it is also possible for example, to use triphenyl methane-4,4',4"-triisocyanate, polyphenyl polymethylene polyisocyanates described in British Pat. Nos. 874,430 and 848,671, m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in U.S. Pat. No. 3,152,162 and in German Offenlegungsschrift Nos. 2,504,400, 2,537,685 and 2,552,350, norbornane diisocyanates according to U.S. Pat. No. 3,492,330, polyisocyanates containing allophanate groups of the type described, for example, in British Pat. No. 994,890, in Belgian Pat. No. 761,626 and in Dutch Patent Application No. 7,102,524, polyisocyanates containing isocyanurate groups of the type described, for example in U.S. Pat. No. 3,001,973, in German Pat. Nos. 1,022,789, 1,222,067 and 1,027,394 and German Offenlegungsschrift Nos. 1,929,034 and 2,004,048, polyisocyanates containing urethane groups of the type described, for example, in Belgian Pat. No. 752,261 or in U.S. Pat. Nos. 3,394,164 and 3,644,457, polyisocyanates containing acrylated urea groups according to German Pat. No. 1,230,778, polyisocyanates containing biuret groups of the type described, for example, in U.S. Pat. Nos. 3,124,605, 3,201,372 and 3,124,605 and in British Pat. No. 889.050, polyisocyanates produced by telomerization reactions of the type described for example in U.S. Pat. No. 3,654,106, polyisocyanates containing ester groups of the type described, for example, in British Pat. Nos. 965,474 and 1,072,956, in U.S. Pat. No. 3,567,763 and in German Pat. No. 1,231,688, reaction products of the above-mentioned diisocyanates with acetals according to German Pat. No. 1,072,385 and polyisocyanates containing polymeric fatty acid esters according to U.S. Pat. No. 3,455,883.

It is also possible to use distillation residues having isocyanate groups obtained in the commercial production of isocyanates, optionally in solution in one or more of the above-mentioned polyisocyanates. It is also possible to use any mixtures of the above-mentioned polyisocyanates.

Preferred polyisocyanates are hexamethylene diisocyanate, its isocyanurate and its biuret; 4,4'-methylenebis(cyclohexylisocyanate); 1-isocyanato-3,3,5-trimethyl-5-isocyanatomethyl cyclohexane (isophorone diisocyanate); the tolylene diisocyanates and their isocyanurates; the mixed isocyanurate of tolylene diisocyanate and hexamethylene diisocyanate; the reaction product of 1 mol of trimethylol propane and 3 mols of tolylene diisocyanate and also crude diphenyl methane diisocyanate.

Suitable compounds containing at least 2 isocyanate-reactive hydrogen atoms can be high or low molecular weight compounds, having a weight average molecular weight, generally from about 50 to 50,000. In addition to compounds containing amino groups, thiol groups or carboxyl groups, are, preferably, compounds containing hydroxyl groups, particularly compounds containing from about 2 to 50 hydroxyl groups and above all, compounds having a weight average molecular weight of from about 500 to 25000, preferably from about 700 to 2000, for example, polyesters, polyethers, polythioethers, polyacetals, polycarbonates, poly(meth)acrylates, and polyester amides, containing at least 2, generally from about 2 to 8, but preferably from about 2 to 4 hydroxyl groups, or even hydroxyl-containing prepolymers of these compounds and a less than equivalent quantity of polyisocyanate, of the type known for the production of polyurethanes.

Representatives of the above-mentioned compounds used in accordance with the present invention are described, for example, in High Polymers, Vol. XVI, "Polyurethanes, Chemistry and Technology", By Saunders and Frisch, Interscience Publishers, New York/London, and Vol. I, 1962, pages 32 to 42 and pages 44 to 54 and Vol. II, 1964, pages 5-6 and 198-199, and in "Kunststoff-Handbuch", Vol. VII, Vieweg-Hochtlen, Carl-HanserVerlag, Munich, 1966, for example, on pages 45 to 71. It is, of course, possible to use mixtures of the above-mentioned compounds containing at least two isocyanate-reactive hydrogen atoms and having a molecular weight of from about 50 to 50,000 for example, mixtures of polyethers and polyesters.

In some cases, it is particularly advantageous to combine low-melting and high-melting polyhydroxyl containing compounds with one another (German Offenlegungsschrift No. 2,706,297). Low molecular weight compounds containing at least two isocyanate-reactive hydrogen atoms (molecular weight from about 50 to 400) suitable for use in accordance with the present invention are compounds preferably containing hydroxyl groups and generally containing from about 2 to 8, preferably from about 2 to 4 isocyanate-reactive hydrogen atoms. It is also possible to use mixtures of different compounds containing at least two isocyanate-reactive hydrogen atoms and having a molecular weight in the range of from about 50 to 400. Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Patent No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4,-dihydroxy diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084, 2,714,084, 2,714,104, 2,721,186, 2,738,154 and 2,738,512). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in accordance with the present invention (German Offenlegungsschrift No. 2,638,759).

Many other compounds containing isocyanate-reactive hydrogen atoms and polyisocyanates are useful in the present invention, and are obvious to those skilled in the art of polyurethane science and technology.

Epoxy compounds that can be cured or polymerized in the dual systems by the curing agents of this invention, using the latter in a catalytically effective amount, are those known to undergo cationic polymerization and include 1,2-, 1,3-, and 1,4-cyclic ethers (also designated as 1,2-, 1,3-, and 1,4-epoxides). The 1,2-cyclic ethers are preferred.

The cyclic ethers which can be polymerized in accordance with this invention include those described in "Ring-Opening Polymerizations", Vol. 2, by Frisch and Reegan, Marcel Dekker, Inc. (1969). Suitable 1,2-cyclic ethers are the monomeric and polymeric types of epoxides. They can be aliphatic, cycloaliphatic, aromatic, or heterocyclic and will typically have an epoxy equivalency of from 1 to 6, preferably 1 to 3. Particularly useful are the aliphatic, cycloaliphatic, and glycidyl ether type 1,2-epoxides such as propylene oxide, epichlorohydrin, styrene oxide, vinylcyclohexene oxide, cyclohexeneoxide, vinylcyclohexene dioxide, glycidol, butadiene oxide, glycidyl methacrylate, diglycidyl ether of bisphenol A, 3,4-epoxycyclohexylmethyl-3,4-epoxycyclohexanecarboxylate, 3,4-epoxy-6-methylcyclohexylmethyl-3,4-epoxy-6methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, and epoxy silicones, e.g., dimethylsiloxanes having cycloaliphatic epoxide or glycidyl ether groups.

A wide variety of commercial epoxy resins are available and listed in "Handbook of Epoxy Resins" by Lee and Neville, McGraw Hill Book Company, New York (1967) and in "Epoxy Resin Technology" by P. F. Bruins, John Wiley & Sons, New York (1968). Representative of the 1,3- and 1,4-cyclic ethers which can be polymerized in accordance with this invention are oxetane, 3,3-bis(chloromethyl)oxetane, and tetrahydrofuran.

In particular, cyclic ethers which are readily available include propylene oxide, oxetane, epichlorohydrin, tetrahydrofuran, styrene oxide, cyclohexeneoxide, vinylcyclohexene oxide, glycidol, glycidyl methacrylate, octylene oxide, phenyl glycidyl ether, 1,2-butane oxide, diglycidyl ether of bisphenol A (e.g., "Epon 828" and "DER 331"), vinylcyclohexene dioxide (e.g., "ERL-4206), 3,4-epoxycyclohexylmethyl-3,4epoxycyclohexanecarboxylate (e.g., "ERL-4221"), 3,4-epoxy-6-methylcyclohexylmethyl, 3,4-epoxy-6-methylcyclohexanecarboxylate (e.g.,"ERL-4201"), bis(3,4-epoxy-6-methylcyclohexylmethyl)adipate (e.g., "ERL-4289"), aliphatic epoxy modified with polypropylene glycol (e.g., "ERL-4050" and "ERL-4052"), dipentene dioxide (e.g., "ERL-4269"), epoxidized polybutadiene (e.g., "Oxiron 2001"), silicone epoxy (e.g., "Syl-Kem 90"), 1,4-butanediol diglycidyl ether (e.g., Araldite RD-2), polyglycidyl ether of phenolformaldehyde novolak (e.g., "DER-431", "Epi-Rez 521" and "DER-438"), resorcinol diglycidyl ether (e.g., "Kopoxite"), polyglycol diepoxide (e.g., "DER 736"), polyacrylate epoxide (e.g., "Epocryl U-14"), urethane modified epoxide (e.g., "QX3599"), polyfunctional flexible epoxides (e.g., "Flexibilizer 151"), and mixtures thereof as well as mixtures thereof with co-curatives, curing agents, or hardeners which also are well known (see Lee and Neville and Bruins, supra). Representative of the co-curatives of hardeners which can be used are acid anhydrides such as nadic methyl anhydride, cyclopentanetetracarboxylic dianhydride, pyromellitic anhydride, cis-1,2-cyclohexanedicarboxylic anhydride, and mixtures thereof.

As noted above, the organometallic compounds useful in combination with onium salts to provide the curing agents useful in the invention have the formula $$L^1L^2L^3M,\qquad\text{I.}$$

Ligands $L^1$ to $L^3$ are well known in the art of transition metal organometallic compounds.

Ligand $L^1$ of general formula I is provided by any monomeric or polymeric compound having an accessible unsaturated group, i.e., an ethylenic,

group; acetylenic, —C≡C— group; or aromatic group which has accessible pi-electrons regardless of the total molecular weight of the compound. By "accessible", it is meant that the compound (or precursor compound from which the accessible compound is prepared) bearing the unsaturated group is soluble in a reaction medium, such as an alcohol, e.g., methanol; a ketone, e.g., methyl ethyl ketone; an ester, e.g., amyl acetate; a halocarbon, e.g., trichloroethylene; an alkane, e.g., decalin; an aromatic hydrocarbon, e.g., anisole; an ether, e.g., tetrahydrofuran; etc, or that the compound is divisible into very fine particles of high surface area so that the unsaturated group (including aromatic group) is sufficiently close to a metal atom to form a pi-bond between that unsaturated group and the metal atom. By polymeric compound, is meant, as explained below, that the ligand can be a group on a polymeric chain.

Illustrative of ligand $L^1$ are the linear and cyclic ethylenic and acetylenic compounds having less than 100 carbon atoms, preferably having less than 60 carbon atoms, and from zero to 10 hetero atoms selected from nitrogen, sulfur, non-peroxidic oxygen, phosphorous, arsenic, selenium, boron, antimony, tellurium, silicon, germanium, and tin, such as, for example, ethylene, acetylene, propylene, methylacetylene, 1-butene, 2-butene, diacetylene, butadiene, 1,2-dimethylacetylene, cyclobutene, pentene, cyclopentene, hexene, oyclohexene, 1,3-cyclohexadiene, cyclopentadiene, 1,4-cyclohexadiene, cycloheptene, 1-octene, 4-octene, 3,4-dimethyl-3-hexene, and 1-decene; $eta^3$-allyl, $eta^3$-pentenyl, norbornadiene, $eta^5$-cyclohexadienyl, cycloheptatriene, cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorous, arsenic, selenium, boron, antimony, tellurium, silicon, germanium, and tin, such as, for example, $eta^5$-cyclopentadienyl, benzene, mesitylene, hexamethylbenzene, fluorene, naphthalene, anthracene, chrysene, pyrene, $eta^7$-cycloheptatrienyl, triphenylmethane, paracyclophane, 1,4-diphenylbutane, $eta^5$-pyrrole, $eta^5$-thiophene, $eta^5$-furan, pyridine, gammapicoline, quinaldine, benzopyran, thiochrome, benzoxazine, indole, acridine, carbazole, triphenylene, silabenzene, arsabenzene, stibabenzene, 2,4,6-triphenylphosphabenzene, $eta^5$-selenophene, dibenzostannepine, $eta^5$-tellurophene, phenothiarsine, selenanthrene, phenoxaphosphine, phenarsazine, phenatellurazine, $eta^5$-methylcyclopentadienyl, $eta^5$-pentamethylcyclopentadienyl, and 1-phenylborabenzene. Other suitable aromatic compounds can be found by consulting any of many chemical handbooks.

As mentioned before, the ligand can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene); the pyridine group in poly(vinylpyridine), etc. Polymers having a weight average molecular weight up to 1,000,000 or more can be used. It is preferable that 5 to 50 percent of the unsaturated or aromatic groups present in the polymer be complexed with metallic cations.

Each ligand $L^1$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermyl; tributylstannyl; methylseleno; ethyltelluro; and trimethylsiloxy; condensed rings such as benzo, cyclopenta; naphtho, indeno; and the like.

Each ligand $L^2$ in formula I is provided by monodentate and polydentate compounds preferably containing up to about 30 carbon atoms and up to 10 hetero atoms selected from nitrogen, sulfur, non-peroxidic oxygen, phosphorous, arsenic, selenium, antimony, and tellurium, where upon addition to the metal atom, following loss of zero, one, or two hydrogens, the polydentate compounds preferably forming with the metal, M, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., NO+); compounds of Group VA elements such as ammonia, phosphine, trimethylamine, trimethylphosphine, triphenylamine, triphenylphosphine, triphenylarsine, triphenylstibine, tributylphosphite, isonitriles such as phenylisonitrile, butylisonitrile; carbene groups such as ethoxymethylcarbene, dithiomethoxycarbene; alkylidenes such as methylidene, ethylidene; suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, 1,3-diisocyanopropane, and hydridotripyrrazolyborate; the hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

Suitable ligands $L^3$ in formula I include any group having in its structure an atom with an unshared electron. Suitable groups can contain any number of carbon atoms and hetero atoms but preferably contain less than 30 carbon atoms and up to 10 hetero atoms selected from nitrogen, sulfur, oxygen, phosphorus, arsenic, selenium, antimony, tellurium, silicon, germanium, tin, and boron. Examples of such groups are hydrocarbyl groups such as methyl, ethyl, propyl, hexyl, dodecyl, phenyl, tolyl, etc.; unsaturated hydrocarbyl groups such as vinyl, $eta^1$-allyl, $eta^1$-butenyl, $eta^1$-cyclohexenyl; the hydrocarbyl derivatives of a Group IVA element such as trimethylgermanyl, triphenylstannyl, and trimethylsilyl, triphenyllead, etc.; and organic groups such as formyl, acetyl, propionyl, acryloyl, octadecoyl, benzoyl, toluenesulfonyl, oxalyl, malonyl, o-phthaloyl.

Also suitable as $L^3$ is any group having in its structure two, three, or four unshared electrons, with the proviso that only one electron is shared per metal M. Examples of such groups are $CH_2$, $SiMe_2$, $SiPh_2$, $SnPh_2$, $GePh_2$, SiMe, SiPh, SnPh, Si, and Sn.

M can be any element from the Periodic Groups IVB, VB, VIB, VIIB, and VIIIB, such as, for example, Ti, Zr, Hf, V, Nb, Ta, Cr, Mo, W, Mn, Tc, Re, Fe, Ru, Os, Co, Rh, Ir, Ni, Pd and Pt.

In general, radiation-induced polymerization of ethylenically-unsaturated monomers, epoxy monomers, or polyurethane precursors with latent curing agents comprising an organometallic compound and an onium salt can be carried out at room temperature for the majority of energy curable compositions, although low temperature (e.g., $-10°$ C.) or elevated temperature (e.g., $30°$ to $200°$ C., preferably $50°$ to $150°$ C.) can be used to subdue the exotherm of polymerization or to accelerate the polymerization, respectively. Temperature of polymerization and amount of catalyst will vary and be dependent on the particular curable composition used and the desired application of the polymerized or cured product. The amount of curing agent to be used in this invention should be sufficient to effect polymerization of the monomers or precursors (i.e., a catalytically-effective amount) under the desired use conditions. Such amount generally will be in the range of about 0.1 to 20 weight percent, and preferably 0.1 to 10.0 weight percent, based on the weight of curable composition.

While not wishing to be bound by theory, we propose that when specified organometallic compounds are irradiated in the presence of suitable oxidizing agents such as onium salts, intermediate compounds are produced which can affect the curing of epoxides, polyurethane precursors, and vinyl monomers. It is believed that the transition metal-transition metal or metal-$L^3$ sigma bond cleaves homolytically upon photolysis. Evidence for this homolytic cleavage is provided for some organometallic compounds such as $[CpFe(CO)_2]_2$ and $Mn_2(CO)_{10}$ and involves the abstraction of Cl from $CCl_4$ subsequent to photolysis (Geoffroy and Wrighton, "Organometallic Photochemistry" Academic Press, NY (1979) Chap 2 and 8, particularly p. 138.) In other cases spectroscopic data provides such evidence. (O. Hackelberg, A. Wojcicki *Inorg. Chim. Acta*, 1980, 44, L63; R. G. Severson, A. Wojcicki *J. Organomet. Chem.* 1978, 157, 173). The product(s) of this bond homolysis then reacts with the oxidizing agent. By this process, the catalytic species for the polymerization of either the polyurethane precursors or epoxy monomers is derived from the organometallic compound, and, simultaneously the free radical initiator for the polymerization of the ethylenically unsaturated monomers is derived from the oxidizing agent. In the limit, cleavage of the sigma bond by one photon can ultimately lead to the production of two organometallic-derived species and two free radical initiators. It should be noted that competing or secondary photoprocesses, such as dissociation of a carbonyl ligand, can occur. Such processes however, occur in such a manner as to such an extent that the effective catalytic species and initiator are still produced so as to effect curing of the composition.

Solvents, preferably organic, can be used to assist in dissolution of the curing agent in the ethylenically-unsaturated monomer, the polyurethane precursors, or the epoxy monomers, and as a processing aid. Representative solvents include acetone, methyl ethyl ketone, cyclopentanone, methyl cellosolve acetate, methylene chloride, nitromethane, methyl formate, acetonitrile, gamma-butyrolactone, and 1,2-dimethoxyethane (glyme). In some applications, it may be advantageous to adsorb the curing agent onto an inert support such as silica, alumina, clays, etc., as described in U.S. Pat. No. 4,677,137.

For those compositions of the invention which are radiation-sensitive, i.e., the compositions containing ethylenically-unsaturated monomers, epoxy monomers, or polyurethane precursors and as curing agent as a combination of an organometallic compound of Formula I and an onium salt of Formula II, any source of radiation including electron beam radiation and radiation sources emitting active radiation in the ultraviolet and visible region of the spectrum (e.g., about 200 to 800 nm) can be used. Suitable sources of radiation include mercury vapor discharge lamps, carbon arcs, tungsten lamps, xenon lamps, lasers, sunlight, etc. The required amount of exposure to effect polymerization is dependent upon such factors as the identity and concentrations of the organometallic compound and onium salt, the particular ethylenically unsaturated monomer, polyurethane precursors, or epoxy monomers, the thickness of the exposed material, type of substrate, intensity of the radiation source and amount of heat associated with the radiation.

Thermal polymerization using direct heating or infrared electromagnetic radiation, as is known in the art, can be used to cure ethylenically-unsaturated or polyurethane precursors according to the teachings of this invention.

It is within the scope of this invention to include two-stage polymerization (curing), by first activating curing agent by irradiating the curable compositions and subsequently thermally curing the activated precursors so obtained, the irradiation temperature being below the temperature employed for the subsequent heat-curing. These activated precursors may normally be cured at temperatures which are substantially lower than those required for the direct thermal curing, with an advantage in the range from 50° to 110° C. This two-stage curing also makes it possible to control the polymerization in a particularly simple and advantageous. manner.

Adjuvants such as solvents, pigments, abrasive granules, stabilizers, light stabilizers, antioxidants, flow agents, bodying agents, flatting agents, colorants, inert fillers, binders, blowing agents, fungicides, bactericides, surfactants, plasticizers, and other additives as known to those skilled in the art can be added to the compositions of this invention. These can be added in an amount effective for their intended purpose.

Compositions of this invention are useful for coatings, foams, shaped articles, adhesives, filled or reinforced composites, abrasives, caulking and sealing compounds, casting and molding compounds, potting and encapsulated compounds, impregnating and coating compounds, and other applications which are known to those skilled in the art.

Compositions of this invention may be applied, preferably as a liquid, to a substrate such as steel, aluminum, copper, cadmium, zinc, glass, paper, wood, or various plastic films such as poly(ethylene terephthalate), plasticized poly(vinylchloride), poly(propylene), poly(ethylene), and the like, and irradiated. By polymerizing part of the coating, as by irradiation through a mask, those sections which have not been exposed may be washed with a solvent to remove the unpolymerized portions while leaving the photopolymerized, insoluble portions in place. Thus, compositions of this invention may be used in the production of articles useful in the graphic arts such as printing plates and printed circuits. Methods of producing printing plates and printed circuits from photopolymerizing compositions are well known in the art (see for example British Patent Specification No. 1,495,746).

Objects and advantages of this invention are further illustrated by the following examples, but the particular materials and amounts thereof recited in these examples, as well as other conditions and details, should not be construed to unduly limit this invention. In the examples, all parts are parts by weight unless indicated otherwise. All examples were prepared in ambient atmosphere (presence of oxygen and water) unless indicated otherwise. In the examples:

Me=methyl
Ph=phenyl
Cp=cyclopentadienyl

EXAMPLE 1

The organometallic compounds, $[CpFe(CO)_2]_2$, $Mn_2(CO)_{10}$, $Re_2(CO)_{10}$ and $[CpMo(CO)_3]_2$ were obtained from Pressure Chemical Company and used without further purification. The other compounds were prepared using standard organometallic synthetic techniques. The procedure used will be illustrated for the preparation of $CpFe(CO)_2SnPh_3$.

The anion, $CpFe(CO)_2^-$, was produced by reducing 3.0 g of $[CpFe(CO)_2]_2$ with 0.41 g of sodium and 0.50 g of benzophenone in 200 mL of freshly distilled tetrahydrofuran under an atmosphere of argon. The reaction was allowed to proceed for about 24 hours by which time the starting material had all been reduced to the anion as indicated by infrared spectroscopy (IR). To the solution of the anion was added, under argon, 6.5 g of $ClSnPh_3$ as a solid. The reaction was stirred until the anion was consumed as shown by IR. The reaction vessel was opened to air and the solvent removed under reduced pressure. The solid residue was taken up in methylene chloride and passed down a short silica gel column. Crystals were obtained by removing the methylene chloride under reduced pressure and adding heptane. The product was identified by IR, nuclear magnetic resonance spectroscopy (NMR), elemental analysis and melting point. In a similar manner all the other materials in Table I were prepared.

These compounds are used in subsequent examples.

TABLE I

Characterization of Compounds
Elemental Analysis
(Report/Calculated)

| Compound | % C | % H | Melting Point °C. |
|---|---|---|---|
| $CpFe(CO)_2SnPh_3$ | 57.0/57.0 | 3.8/3.8 | 135–136 |
| $CpFe(CO)_2GePh_3$ | 62.3/62.4 | 4.2/4.2 | 159–160 |
| $CpFe(CO)_2PbPh_3$ | | | |
| $[CpFe(CO)_2]_2SnPh_2$ | 49.7/49.8 | 3.3/3.2 | 146–149 |
| $(CO)_5MnSnPh_3$ | 51.0/50.7 | 2.8/2.8 | 146–149 |
| $(CO)_5MnPbPh_3$ | | | |
| $[(CO)_5Mn]_2SnPh_2$ | 39.9/39.8 | 1.6/1.5 | 138–139 |
| $(CO)_5ReSnPh_3$ | | | |
| $CpMoSnPh_3$ | 52.6/52.5 | 3.4/3.4 | 213–214 |

EXAMPLE 2

Several organometallic compounds were prepared according to literature methods. $CpW(CO)_2CH_2$ was prepared according to the method of T. S. Piper, G. Wilkinson, *Inorg. Nucl Chem.*, 1956, 3104–124. $[CpW(CO)_3]_2$ was prepared according to the method of R. Birdwhistell, P. Hackett, A. R. Manning, *J. Organomet. Chem.*, 1978, 157, 239. $CpFe(CO)_2SiPh_3$ was prepared according to the method of G. Cerveau, E. Colomer, R. Corriv, W. E. Douglas, *J. Organomet. Chem.*, 1977, 135, 373, 386. The method of J. P. Bibler, A. Wojcicki, *J. Amer. Chem. Soc.*, 1966, 88, 4862 was used to prepare $CpFe(CO)_2(CH_2Ph)$, and that of R. B. King, M. B. Bisnette, *J. Organomet Chem.*, 1964, 2, 15–37, to prepare $CpFe(CO)_2(COPh)$. The preparation of $CpPtMe_3$ has been described in U.S. Pat. No. 4,600,484. These compounds are used in subsequent examples.

EXAMPLE 3

This example illustrates the use of an organometallic compound containing a transition metal-transition metal single bond in the curing agent to photocatalyze the formation of polyurethane. A stock solution of 8.02 g 4,4'-methylenebis(cyclohexylisocyanate) (Desmodur ™ W, a Mobay Corp., Pittsburgh, Pa.) and 11.20 g polyethylene glycol, m. wt. 400 (Carbowax ™ 400, Union Carbide, Danbury, Conn.) was prepared. To a solution of 0.01 g $[CpFe(CO)_2]_2$ and 0.02 g $Ph_1I^+$ $PF_6^-$ in 0.1 g gamma-butyrolactone was added 1.25 g of the stock solution. The sample was photocured to a solid using a Kodak ™ Carousel ™ projector in 12 minutes.

Three samples were prepared as above, except the iron dimer and iodonium salt were added as follows: sample (a), 0.01 g $[CpFe(CO)_2]_2$, 0.03 g $Ph_1I^+$ $PF_6^-$; sample (b), 0.01 g $[CpFe(CO)_2]_2$; sample (c), 0.03 g $Ph_2I^+$ $PF_6^-$; (a) was left in the dark while samples (b) and (c) were irradiated as above. None of the three samples showed evidence of any curing, no obvious change in viscosity as evidence, after 20 minutes.

EXAMPLE 4

This example illustrates the use of an organometallic compound containing a transition metal-carbon single bond in the curing agent to photocatalyze the formation of polyurethane. 0.52 g Desmodur W (4,4'-methylene bis (cyclohexyl isocyanate)) and 0.72 g Carbowax 400 (polyol) were combined and added to ca. 0.01 g $CpPt(CH_3)_3$ (Cp=eta$^5$-cyclopentadienyl) which had been dissolved in ca. 0.15 ml of a mixture of $CH_2Cl_2$ and gamma-butyrolactone. The resulting mixture was irradiated with a Hanovia ™ 450 watt medium pressure mercury arc lamp through Pyrex ™. Complete cure was achieved within 12 minutes irradiation time.

EXAMPLE 5

This example illustrates the photocuring of polyurethane precursors to polyurethanes in the presence and absence of $O_2$ using transition metal-transition metal bond containing organometallic compounds and onium salt as curing agent.

A mixture of 10 mg $[CpFe(CO)_2]_2$, 30 mg $Ph_2I^+$ $PF_6^-$, 0.1 g gamma-butyrolactone, 0.83 g Desmodur ™ W (4,4'-methylenebis(cyclohexylisocyanate)), and 1.17 g polyethyleneglycol (MW=400) was divided in half, one half was bubbled with $N_2$ for 2-3 minutes, the other left open to the atmosphere. Both samples were irradiated simultaneously with the output of a 450 watt Hanovia mercury lamp, filtered through Pyrex and a water infrared filter. Both samples cured after 10.0 minutes irradiation. This demonstrates that in the presence of onium salt curing occurs with or without $O_2$ present.

EXAMPLE 6

This example describes the photocuring of polyurethane precursors using transition metal-containing organometallic compounds and iodonium and sulfonium salts. A stock solution was prepared from 7 pars Desmodur W, 1.9 pars butanediol, and 0.5 parts trimethylolpropane. Samples were prepared as in Example 3 using 1.25 g of the stock solution, 0.01 g neutral metal-metal bonded compound and 0.015 g $Ph_2I^+$ $PF_6^-$ in 0.05 g gamma-butyrolactone. Irradiations were carried out on a 450 W Hanovia medium pressure mercury arc through Pyrex. Alternatively, these compositions can be cured thermally.

TABLE II

| | Iodonium and Sulfonium Salts | |
|---|---|---|
| Organometallic | Cure time, minutes | |
| compound | $Ph_2I^+$ $PF_6^-$ | $Ph_3S^+$ $PF_6^-$ |
| $[Co(CO)_4]_2$ | 6.0 | >100 |
| $[CpFe(CO)_2]_2$ | 9.0 | 20-25 |
| $[Mn(CO)_5]_2$ | 12-20 | 7-12 |
| $[Re(CO)_5]_2$ | 20-40 | 20-40 |

TABLE II-continued

| | Iodonium and Sulfonium Salts | |
|---|---|---|
| Organometallic | Cure time, minutes | |
| compound | $Ph_2I^+$ $PF_6^-$ | $Ph_3S^+$ $PF_6^-$ |
| $Co_4(CO)_{12}$ | 40-55 | 55-66 |
| $[CpMo(CO)_3]_2$ | 55-67 | 60-66 |
| $Fe_2(CO)_9$ | about 60 | — |

EXAMPLE 7

This provides further examples of bicomponent curing agents wherein organometallic compounds contain transition metal-carbon bonds which are effective in the curing agent for polyurethane precursors. A stock solution of polyurethane precursor was prepared by mixing 23.1 g Desmodur W and 32.6 g Carbowax 400 and shaking well before use. Samples were prepared by dissolving 10 mg catalyst and 20 mg diphenyliodonium hexafluorophosphate (if used) in 0.2 g $CH_2Cl$. 2.0 g stock solution was added in the dark, and samples were then irradiated under a Hanovia Quartz Utility Lamp. The temperature of samples under the lamp reached ca. 50° C. within 10 min. The time to a viscosity increase is noted in Table III, and "cure time" is the time for a sample to become so viscous that it would not flow. "Partial cure" is indicated when, within 30 min irradiation, the sample became more viscous but would still flow.

TABLE III

| Curing of Urethane Precursors | | |
|---|---|---|
| | Cure Rates, min | |
| | Viscocity increase | Cured |
| CpPtMe$_3$ | 7 | 30 |
| CpPtMe$_3$ + iodonium | 7 | 30 |
| CpW(CO)$_3$Me | 30 | partial |
| CpW(CO)$_3$Me + iodonium | 30 | partial |
| [(PMe$_2$Ph)$_2$PtMe$_3$(acetone)] + $PF_6^{-a}$ | 13 | partial |
| [CpFe(CO)$_2$)]$_2$ + iodonium$^a$ | 9 | 30 |

$^a$ included for purposes of comparison

The data show curing occurs with or without iodonium salts. In some cases, adventitious oxygen can provide a suitable oxidizing agent. However, the use of onium salts is preferred since it is much easier to control the organometallic/oxidizing agent ratio.

EXAMPLE 8

This example describes the use of the curing agent containing an organometallic compound containing a transition metal-carbon bond to cure epoxies. Each sample was prepared by dissolving 10 mg catalyst and 20 mg diphenyliodonium hexafluorophosphate (if used) in 0.2 g $CH_2Cl_2$. 2.0 g cyclohexene oxide was added in the dark, and samples were then irradiated under a Hanovia Quartz Utility lamp. Initial formation of polymer was tested by placing a few drops of the sample in about 2 ml methanol. Formation of precipitate indicated that polymer had formed. Further polymerization resulted in a viscosity increase in the sample. Results are indicated in Table IV.

TABLE IV

| Curing agent | Precipitate formed, min. | Viscosity increased min. |
|---|---|---|
| CpPtMe$_3$ | no cure | no cure |
| CpPtMe$_3$ + iodonium | 3.5 | 30 |

TABLE IV-continued

| Curing agent | Precipitate formed, min. | Viscosity increased min. |
|---|---|---|
| CpW(CO)$_3$Me + iodonium | 3 | 30 |
| (PMe$_2$Ph)$_2$PtMe$_3$(acetone) + PF$_6^{-a}$ | 2 | no further cure |
| [CpFe(CO)$_2$]$_2$ + iodonium | 2 | 30 |

[a]included for purposes of comparison.

EXAMPLE 9

Examples of the ability of curing agent containing transition metal-transition metal bonded and M-L$^3$ type organometallic compounds and onium salt to photoinitiate the cure of epoxies are provided here. The tests were carried out in the following manner: Into a glass vial were weighed out 0.10 g of the desired organometallic compound and/or 0.20 g diphenyliodonium hexafluorophosphate (3M Company, recrystallized from acetone/isopropanol). Then, the following operations were carried out under subdued light, 0.3 g of gamma-butyrolactone, 2.0 g cyclohexene oxide (Aldrich Chemical Company, distilled), 5.0 g of 3,4-epoxycyclohexylmethyl-3,4-epoxycyclohexane carboxylate (ERL-4221, Union Carbide Company) were added to prepare the coating solution. The solutions were coated onto 76 micrometers (3 mil) polyvinylidene chloride subbed polyester (3M Company) using a #22 wire wound rod. The sample coatings were exposed, in air, to a 275 watt G.E. sunlamp at a distance of 10 cm. The time to "set to cotton" is recorded in Table V, that is the time needed to cure the coating so that when it is touched with a cotton ball, it leaves no smear or picks up no cotton threads. This test establishes the time required to cure the coating. Under the conditions of this test, the diphenyliodonium hexafluorophosphate alone requires greater than 10 min to cure.

TABLE V

| | Photoinitiation of Epoxy Cure | |
|---|---|---|
| | Cure Time$^a$ | |
| Compound | No Onium Salt Added | Onium Salt Added |
| [CpFe(CO)$_2$]$_2$ | >10 | 1 |
| CpFe(CO)$_2$SnPh$_3$ | >10 | 5 |
| CpFe(CO)$_2$GePh$_3$ | >10 | 5 |
| [CpFe(CO)$_2$]$_2$SnPh$_2$ | >10 | 3 |
| Mn$_2$(CO)$_{10}$ | >10 | 1 |
| (CO)$_5$MnSnPh$_3$ | >10 | 4 |
| ](CO)$_5$Mn]$_2$SnPh$_2$ | >10 | 3 |
| Re$_2$(CO)$_{10}$ | 1 | 1.5 |
| CpMo(CO)$_3$SnPh$_3$ | 8 | 4 |

[a]time in minutes to cure.

EXAMPLE 10

To further demonstrate the activity of the curing agent, a series of experiments were carried out in another epoxy and/or acrylate composition. The organometallic compound, with and without the onium salt, was photolyzed in presence of an epoxy or acrylate. The specific system used is as follows: methyl acrylate was distilled from hydroquinone and stored cold until ready for use. Cyclohexene oxide was used as obtained from Aldrich. The organometallic compounds were obtained from commercial sources. Diphenyliodonium hexafluorophosphate was recrystallized from acetone/isopropanol. All experiments were done as 100% solids, except as noted.

In a small vial was placed 0.02 g of the organometallic compound with/without 0.04 g of the iodonium salt along with 2 g of the desired monomer. For the acrylate tests, the solutions were purged with N$_2$ for 60 sec before and continuously during the photolysis. The epoxy tests were performed without purging, vials open to the air. The light source was one 15 watt daylight fluorescent bulb. In Table VI below, the cure times represent the time required to reach the same degree of cure, usually gelation of the solution. Alternatively, the compositions can be cured thermally.

TABLE VI

| Photoinitiated Cure Times of Epoxy and Acrylate Compositions$^a$ | | |
|---|---|---|
| Catalyst System | Epoxy | Acrylate |
| [CpFe(CO)$_2$]$_2$ | >900 | >600 |
| [CpFe(CO)$_2$]$_2$/iodonium | 60 | 30 |
| Mn$_2$(CO)$_{10}$ | >900 | >600 |
| Mn$_2$(CO)$_{10}$/iodonium | 200 | 45 |
| Re$_2$(CO)$_{10}$ | >900 | 360 |
| Re$_2$(CO)$_{10}$/iodonium | 200 | 60 |
| Co$_2$(CO)$_8$ | b | b |
| Co$_2$(CO)$_8$/iodonium | c | 200 |
| Co$_4$(CO)$_{12}$ | b | b |
| Co$_4$(CO)$_{12}$/iodonium$^d$ | >900 | 80 |
| iodonium | >900 | >300 |

[a]Cure time in seconds.
[b]Not done.
[c]Reacted in the dark upon mixing.
[d]10% by wt. gamma-butyrolactone added.

EXAMPLE 11

This example demonstrates the ability of transition metal-transition metal bonded and M-L$^3$ type organometallic compounds to photoinitiate the cure of ethylenically-unsaturated compounds in the presence of iodonium salts. The tests were carried out in the following manner: Into a glass vial were weighed out 0.05 g of the desired organometallic compound and/or 0.10 g diphenyliodonium hexafluorophosphate (3M Company, recrystallized from acetone/isopropanol). Then, the following operations were carried out under subdued light: 0.2 g of gamma-butyrolactone, 5.0 g methyl acrylate (Aldrich Chemical Company, distilled from hydroquinone), 5.0 g of pentaerythritol tetraacrylate (SR-295, Sartomer Company) were added to prepare the coating solution. The solutions were coated onto 76 micrometers (3 mil) polyvinylidene chloride subbed polyester (3M Company) using a #22 wire wound rod. The sample coatings were overlayed with a second sheet of polyester and exposed to two 15 watt Sylvania TM blacklight bulbs at a distance of 2 cm. The time required to produce a nontacky cured coating was recorded. Under the conditions of this test, the diphenyliodonium hexafluorophosphate alone requires greater than 15 min to cure.

TABLE VII

| Curing of Ethylenically Unsaturated Monomers | | |
|---|---|---|
| | Cure Time$^a$ | |
| Organometallic Compound | No Onium Salt Added | Onium Salt Added |
| [CpFe(CO)$_2$]$_2$ | >600 | 15 |
| CpFe(CO)$_2$SnPh$_3$ | >600 | 120 |
| CpFe(CO)$_2$GePh$_3$ | >600 | 120 |
| [CpFe(CO)$_2$]$_2$SnPh$_2$ | >600 | 60 |
| Mn$_2$(CO)$_{10}$ | >600 | <15 |
| (CO)$_5$MnSnPh$_3$ | 300 | 300 |
| [(CO)$_5$Mn]$_2$SnPh$_2$ | 60 | 30 |
| Re$_2$(CO)$_{10}$ | 120 | 60 |
| [CpMo(CO)$_3$]$_2^b$ | >600 | 30 |

TABLE VII-continued

Curing of Ethylenically Unsaturated Monomers

| | Cure Time[a] | |
|---|---|---|
| Organometallic Compound | No Onium Salt Added | Onium Salt Added |
| CpMo(CO)$_3$SnPh$_3$ | >600 | 240 |

[a]time in seconds to cure.
[b]saturated solution, < 0.01 g dissolved.

EXAMPLE 12

Further examples of the curing of ethylenically unsaturated monomer (25 g of pentaerythritol tetraacrylate in 225 g acetonitrile) or epoxy monomer (cyclohexene oxide) are provided here. A curable composition consisted of 0.01 g of the organometallic compound or 0.02 g of diphenyliodonium hexafluorophosphate or these same amounts of both compounds added to either monomer. The light sources used were for UV exposure, about 360 nm, two 15 watt G.E. blacklite bulbs and for the visible, a Kodak Carousel Projector or the projector with a 440 nm filter. The initiation of polymerization was detected by solution gelation for the acrylate and for the epoxy the precipitation of the polymer from a 2% ammonia/methanol solution. Free radical systems were purged with N$_2$ for 2 minutes before and continuously during irradiation while the cationic samples were left open to the air without purging. Sample size was 2 to 3 mL in a 13×100 mm pyrex test tube. The results of these tests are shown in Table VIII.

TABLE VIII

Photoinitiated Cure Times of Epoxy and Acrylate Compositions[a]

| Curing agent | Epoxy | Acrylate |
|---|---|---|
| [CpFe(CO)$_2$]$_2$ | >180[b] | >300[b] |
| [CPFe(CO)$_2$]$_2$/iodonium[c] | 90[b] | <5[b] |
| | 90[d] | <5[d] |
| Mn$_2$(CO)$_{10}$ | >180[b] | >300[b] |
| | >180[e] | >300[e] |
| Mn$_2$(CO)$_{10}$/iodonium[c] | >180[b] | <10[b] |
| | >180[e] | <10[e] |

[a]Cure times given in seconds.
[b]Unfiltered projector as light source.
[c]The diphenyliodonium salt showed no indication of polymerization by itself under these same conditions.
[d]440 nm filter used with the projector.
[e]Blacklite used as the light source, ca 360 nm.

EXAMPLE 13

Examples of the photocuring of ethylenically unsaturated monomers using transition metal-transition metal bond containing organometallic compounds and iodonium salts are given here.

Samples were prepared as 1.0 g methyl acrylate containing 0.01 g metal-metal bond containing complex and 0.015 g Ph$_2$I$^+$ PF$_6^-$. Up to 0.05 g butyrolactone or methylene chloride were used to dissolve the photocatalyst systems. Samples were bubbled with N$_2$ and irradiated using a Kodak Carousel slide projector, with a 360 nm cutoff filter, and the time required to cure the sample recorded in Table IX. Alternatively, the compositions can be cured thermally.

TABLE IX

Curing of Ethylenically Unsaturated Monomers

| Compound and Ph$_2$I$^+$PF$_6^-$ | Conditions | Cure Time |
|---|---|---|
| [CpFe(CO)$_2$]$_2$ | irrad. | 30 sec, slow dark reaction |
| Mn$_2$(CO)$_{10}$ | irrad. | 30 sec, no dark reaction |
| [CpMo(CO)$_3$]$_2$ | irrad. | 45 sec, no dark reaction |
| [Re(CO)$_5$]$_2$ | irrad. | 8 min, no dark reaction |
| Co$_4$(CO)$_{12}$ | irrad. | Minutes, slow dark reaction |
| Co$_2$(CO)$_8$ | Dark | Cures during deoxygenation |

EXAMPLE 14

This example describes the curing of ethylenically-unsaturated monomers with transition metal-carbon bonded organometallic compounds. Each sample was prepared by dissolving 10 mg catalyst and 20 mg diphenyliodonium hexafluorophosphate (if used) in 0.2 g gamma-butyrolactone. 2.0 g methyl acrylate (distilled to remove inhibitors) was added in the dark and nitrogen was bubbled through the sample for 2 min to remove oxygen. Samples were then irradiated in front of a Kodak Carousel Projector containing a 360 nm cutoff filter. If no curing occurred in 15 min, the sample was then irradiated for 15 min under a Hanovia Quartz Utility lamp. In Table X, "cure time" refers to the time required for a sample to solidify. Alternatively, these examples can be cured thermally.

TABLE X

Curing of Vinyl Ethylenically-Unsaturated Monomer

| Curing agent | Cure time, min |
|---|---|
| CpPtMe$_3$ | 15 (Hanovia) |
| CpPtMe$_3$ + iodonium | 6 (Kodak) |
| CpW(CO)$_3$Me | no cure |
| CpW(CO)$_3$Me + iodonium | 3.5 |
| [CpFe(CO)$_2$]$_2$ + iodonium[a] | 0.5 (dark cure) |

[a]Included for purposes of comparison

EXAMPLE 15

This example describes the use of [CpW(CO)$_3$]$_2$ to cure polyurethane precursors, epoxies or ethylenically unsaturated monomers. Each sample contained 0.01 g [CpW(CO)$_3$]$_2$ and 0.02 g diphenyliodonium hexafluorophosphate (if used) in 0.25 g gamma-butyrolactone, to which was added 2.0 g of precursor or monomer in a vial. Irradiation was then performed with a Kodak Carousel Projector (9 inches away), modified with a 360 nm filter. With a urethane precursor stock solution (prepared as in Example 4), in the presence or absence of onium salt, partial curing to produce a clear solution, occurred in 2 hour irradiation time. Upon standing in room light for 24 hours, an increase in viscosity occurred.

When cyclohexeneoxide was used, and the curing agent consisted of [CpW(CO)$_2$]$_2$ onium an salt, vigorous, exothermic curing occurred within 3 min of irradiation.

When methyl acrylate was used as monomer, no curing occurred in the absence of onium salt. With onium salt present, the sample became viscous within 4 min and solid within 8 min of irradiation time.

Alternatively, the compositions can be cured thermally.

EXAMPLE 16

To demonstrate the utility of the curing agent for curing of polyurethane precursors, epoxies and vinyl monomers for the case where the organometallic compound contains a single bond between a transition metal and a Group IV element, the following samples were prepared. In a vial, 0.01 g of organometallic compound, 0.02 g of diphenyliodonium hexafluorophosphate (if used, as indicated below), and 0.25 g of gamma-butyrolactone were gently agitated until dissolution of the organometallic compound was complete. 2.0 g of polyurethane precursor or monomer was added in reduced light, the vial was capped, and the sample irradiated in front of a Kodak Carousel projector fitted with a 360 nm cutoff filler at a distance of nine inches, and at room temperature (about 25° C.). Particular details and any experimental variations are indicated in Table XI.

TABLE XI

Cure Times: Photoinitiated Curing of Polyurethane Precursors, Epoxies and vinyl Monomers with Transition Metal Group IVA Compounds

| Curing agent | Urethane[a] | Epoxy[b] | Vinyl[c] |
|---|---|---|---|
| $[CpFe(CO)_2]_2$[d] | 120 min (VV)[e] | f | no cure |
| $[CpFe(CO)_2]_2$/iodonium[d] | 60 min (VV) | 30 sec | 1.8 min |
| $CpFe(CO)_2(CH_2PCh)$ | 40 min (V) | f | no cure |
| $CpFe(CO)_2(CH^2Ph)$/iodonium | 40 min (v) | 12 min | 23 min |
| $CpFe(CO)_2(COPh)$ | 120 min (V)[e] | f | no cure |
| $CpFe(CO)_2(COPh)$/iodonium | 120 min (V)[e] | 5 min | 48 hr[g] |
| $CpFe(CO)_2(SiPh_3)$ | 45 min (V)[h] | f | no cure |
| $CpFe(CO)_2(SiPh_3)$/iodonium | 45 min (V)[h] | 5 min | 48 hr[g] |
| $CpFe(CO)_2(GePh_3)$ | 36 min (V)[h] | f | no cure |
| $CpFe(CO)_2(GEPh_3)$/iodonium | 36 min (V)[h] | 2.75 min | no cure |
| $CpFe(CO)_2(SnPh_3)$ | 36 min (S)[h] | f | no cure |
| $CpFe(CO)_2(SnPh_3)$/iodonium | 36 min (V)[h] | 2 min | no cure |
| $CpFe(CO)_2(PbPh_3)$ | 45 min (S)[h] | f | no cure |
| $CpFe(CO)_2(PbPh_3)$/iodonium | 33 min (VV)[h] | no cure | no cure |

[a]Polyurethane precursors are from a stock solution consisting of 23.1 g of Desmodur ™ W and 32.6 g of Carbowax 400. Cure times are followed by an indication in parentheses of extent of cure, where V = viscous, VV = very viscous, S = solid.
[b]Monomer is cyclohexene oxide, purified by distillation. Cure time is defined as the time necessary to observe formation of precipitate when one drop of sample is placed in 2 mL of methanol.
[c]Monomer is methyl acrylate, purified prior to use by distillation under reduced pressure. After monomer addition but before irradiation, samples were deoxygenated by bubbling a stream of nitrogen gas through the solution for 2 min, with care being taken to prevent any light from reaching the sample during oxygenation. Cure is defined by an increase in solution viscosity or a sudden exotherm indicating rapid polymerization (also accompanied by a sudden increase in viscosity).
[d]Included for purposes of comparison to data in other Tables.
[e]60 min irradiation with Carousel Projector, followed by 60 minutes of irradiation in room (fluorescent) light.
[f]This particular combination was not tested.
[g]30 minutes irradiation with Kodak projector, following by 30 minutes irradiation under a Hanovia Quartz Utility Lamp (6 inches from bulb), followed by sample storage/irradiation in room (fluorescent) light.
[h]Irradiation with Hanovia Quartz Utility Lamp (15 cm from bulb) in place of the Kodak Projector.

EXAMPLE 17 (comparative)

This example illustrates the dual curing of polyurethane precursors and ethylenically-unsaturated monomers using the curing agent $[CpFe(CO_2)_2]_2/Ph_2I^+PF_6^-$.

Samples 1.25 g in size, were prepared from stock solutions of 2.08 parts Desmodur ™ W (4,4'-methylenebis(cyclohexylisocyanate)), 2.92 parts polyethyleneglycol (MW=400), 5.0 parts methyl acrylate (freshly distilled), and 0.05 parts $[CpFe(CO)_2]_2$. To half of this stock solution was added 0.062 parts $Ph_2I^+PF_6^-$. Mole ratios for iodonium salt/iron dimer=2.1, NCO/OH=1.0, weight % iron dimer=0.5%, iodonium salt=1.2%. Samples were irradiated simultaneously using 366 nm BlakRay bulbs (15 watts) for 10 min, then analyzed by 400 MHz $^1H$ nuclear magnetic resonance spectroscopy. Conversions are listed in Table XII.

TABLE XII

Dual Curing of Polyurethane Precursors and Ethylenically-Unsaturated Monomers

| Onium Salt | Conditions | Conversion to Polymer | |
| | | Acrylate | Urethane |
|---|---|---|---|
| $Ph_2I^+$ | dark | — | 4% |
| $Ph_2I^+$ | irradiation | 79% | 56% |
| $PH_2I^+$ | irradiation, deoxygenated | 76% | 8% |
| None | dark | 0% | 11% |
| None | irradiation | 24% | 75% |
| None | irradiation, deoxygenated | trace | 10% |

EXAMPLE 18 (comparative)

This example demonstrates simultaneous curing of ethylenically unsaturated monomers and epoxies. Gelation times will not show that both monomers have reacted at the same time. It is possible to use nuclear magnetic resonance spectroscopy to differentiate the two polymers in the presence of each other. The experiment was carried out in the following manner: A 1/1, w/w, mixture of methyl acrylate/cyclohexene oxide was prepared. To a 10g sample of this mixture was added 0.01g of $[CpFe(CO_2)]_2$ or $Mn_2(CO)_{10}$ or diphenyliodonium hexafluorophosphate (0.024g with the iron dimer 0.03 g with the manganese dimmer_. or the specified amounts of both compounds. In a small vial was placed 2 ml of the sample and it was purged for 1 min before and continually during irradiation. The light source was two 15 watt G.E. blacklite bulbs. Irradiation time was 2 minutes. Immediately after completion of the photolysis, the NMR in $CDCl_3$ was taken. The amount of polymerization was determined by the ratio of the peak intensity of the polymer to that of polymer plus monomer. The results of the study are shown in Table XIII.

TABLE XIII

| Percent Conversion to Polymer from NMR Study[a] | | |
| Curing agent | Epoxy | Acrylate |
|---|---|---|
| $[CpFe(CO)_2]_2$ | 0[b] | 18 |
| $[CpFe(CO)_2]_2$/iodonium | 35 | 60 |
| iodonium | <5 | <10 |
| $Mn_2(CO)_{10}$ | <0.5 | <0.5 |
| $Mn_2(CO)_{10}$/iodonium | 37 | 47 |

[a]NMR's taken by on a 400 MHz instrument.
[b]None detected in the NMR.

EXAMPLE 19 (comparative)

This example demonstrates the simultaneous curing of ethylenically unsaturated and epoxy monomers in a crosslinkable system. The curable composition consists of methyl acrylate, cyclohexene oxide and glycidyl acrylate. If only epoxy or acrylate cure are initiated, then this system will produce a soluble polymer. Only if both epoxy and acrylate cure are initiated will a crosslinked insoluble polymer be produced.

All monomers were distilled before use; methyl acrylate and glycidyl acrylate from hydroquinone. Sample preparations were carried out under subdued lights. The polymerizable mixture consisted of 0.2 g gamma-butyrlactone, 1.0 g glycidyl acrylate, 5.0 g methyl acrylate and 5.0 g cyclohexene oxide. Depending on the test, added to this were 0.05 g of the desired organometallic compound and/or 0.1 g diphenyliodonium hexafluorophosphate. A 3 g portion of this composition was placed in a glass vial and irradiated between two 15 watt G.E. daylight fluorescent bulbs using an Ultraviolet Products lamp holder (lamp separation distance 4 cm). The sample was purged with nitrogen for one minute preceding and continuously during photolysis. The irradiation time required to produce a polymer insoluble in chloroform was recorded, and is noted in Table XIV.

Alternatively, these compositions can be cured thermally.

TABLE XIV

Simultaneous Photoinitiation of Free Radical and Epoxy Cure in a Crosslinkable System

| Compound | Cure Time[a] | |
|---|---|---|
| | No Onium Salt Added | Onium Salt Added |
| [CpFe(CO)$_2$]$_2$ | >15 | 1 |
| CpFe(CO)$_2$SnPh$_3$ | >15 | 10 |
| CpFe(CO)$_2$GePh$_3$ | >15 | 15 |
| [CpFe(CO)$_2$]$_2$SnPh$_2$ | >15 | 10 |
| Mn$_2$(CO)$_{10}$ | >15 | 1.5 |
| (CO)$_5$MnSnPh$_3$ | >15 | 10 |
| [(CO)$_5$Mn]$_2$SnPh$_2$ | >10 | 4 |
| Re$_2$(CO)$_{10}$ | >10 | 5 |
| [CpMo(CO)$_3$]$_2$[b] | >15 | 1.5 |
| CpMo(CO)$_3$SnPh$_3$ | >15 | 10 |

[a]time in minutes to produce insoluble crosslinked system. Diphenyliodonium hexafluorophosphate alone under these conditions does not produce a crosslinked system after 15 minutes.
[b]Only 0.01 g of this compound used.

Various modifications and alterations of this invention will become apparent to those skilled in the art without departing from the scope and spirit of this invention, and it should be understood that this invention is not to be unduly limited to the illustrative embodiments set forth herein.

We claim:
1. A polymerizable composition consisting essentially of
   (a) polyurethane precursors comprising at least one monomer comprising at least two isocyanate groups and at least one monomer having at least two isocyanate-reactive hydrogen atoms, and
   (b) a curing agent comprising
      (i) an organometallic compound, said organometallic compound having the formula,

$L^1 L^2 L^3 M$ wherein
   $L^1$ represents none, or 1 to 12 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing 2 to 24 pi-electrons to the valence shell of M;
   $L^2$ represents none, or 1 to 24 ligands that can be the same or different contributing an even number of sigma-electrons selected from mono-, di-, and tridentate ligands, each donating 2, 4, or 6 sigma-electrons to the valence shell of M;
   $L^3$ represents none, or 1 to 12 ligands that can be the same or different, each contributing no more than one sigma-electron each to the valence shell of each M;
   Ligands $L^1$, $L^2$, and $L^3$ can be bridging or non-bridging ligands;

M represents 1 to 4 of the same or different transition metal atom selected from the elements of Periodic Groups IVB, VB, VIB, VIIB, and VIIB; with the proviso that said organometallic compound contains at least one of a metal-metal sigma bond and $L^3$; and with the proviso that $L^1$, $L^2$, $L^3$, and M are chosen so as to achieve a stable configuration, and
   (2) an onium salt selected from the group consisting of salts of halonium compounds and compounds of hypervalent Group VIA elements.

2. The composition according to claim 1 which is photopolymerizable.
3. The composition according to claim 1 which is thermally polymerizable.
4. The composition according to claim 1 wherein said onium salt has the formula II $AX$        II wherein A is an iodonium or sulfonium cation, and
X is an organic sulfonate counterion, or a halogenated metal or metalloid counterion.

5. The composition according to claim 1 wherein said curing agent is present in the range of 0.1 to 20 weight percent of the total composition.
6. The composition according to claim 5 wherein said curing agent is present in the range of 0.1 to 10 weight percent of said total composition.
7. The composition according to claim 1 wherein the ratio of organometallic compound to onium salt of said curing agent is in the range of 10:1 to 1:10 by weight.
8. The composition according to claim 7 wherein the ratio of organometallic compound to onium salt is in the range of 5:1 to 1:5 by weight.
9. The composition according to claim 1 wherein said polyurethane precursor comprises a mixture of polyisocyanates and compounds bearing at least two isocyanate-reactive hydrogen atoms where the ratio of isocyanate groups to isocyanate-reactive hydrogen atoms is in the range 1:2 to 2:1.
10. The composition according to claim 1 wherein said organometallic compound is selected from the group consisting of [CpFe(CO)$_2$]$_2$, Mn$_2$(CO)$_{10}$, CpPt(CH$_3$)$_3$.
11. The composition according to claim 1 wherein said organometallic compound is selected from the group consisting of Mn$_2$ (CO)$_8$ (1,10-phenanthroline) and (CO)$_5$ Mn-FeCp(CO)$_2$.
12. The composition according to claim 1 wherein said onium salt is at least one of Ph$_2$I$^+$PF$_6^-$, Ph$_2$I$^+$SbF$_6^-$, Ph$_2$I$^+$AsF$_6^-$, Ph$_2$I$^+$SbF$_5$(OH)$^-$, Ph$_3$S$^+$PF$_6^-$, Ph$_3$S$^+$SbF$_6^-$, Ph$_3$S$^+$AsF$_6^-$, PhSC$_6$H$_4$SPh$_2^+$SbF$_6^-$, and Ph$_3$S$^+$SbF$_5$ (OH)$^-$, wherein Ph is phenyl.
13. A cured composition according to claim 4.
14. A shaped article according to claim 13.
15. A layered structure comprising a substrate having coated on one surface thereof the polymerizable composition according to claim 1.
16. The cured structure according to claim 15.
17. The layered structure according to claim 15 which is an imageable structure.
18. The polymerizable composition according to claim 1 which further consists of an effective amount of at least one of a solvent, stabilizer, antioxidant, flow agent, bodying agent, flatting agent, colorant, inert filler, binder, blowing agent, fungicide, bacteriocide, surfactant, and plasticizer.

* * * * *

UNITED STATES PATENT AND TRADEMARK OFFICE
CERTIFICATE OF CORRECTION

Page 1 of 2

PATENT NO. : 4,952,612

DATED : August 28, 1990

INVENTOR(S) : Katherine A. Brown-Wensley et al.

It is certified that error appears in the above-identified patent and that said Letters Patent is hereby corrected as shown below:

Col. 5, line 3, after "there", kindly insert -- is also --.

Col. 8, line 1, kindly delete "perhydro-2,4,-" and insert therefor -- perhydro-2,4'- --.

Col. 9, line 52, kindly delete "4,4,-dihy-" and insert therefor -- 4,4'-dihy- --.

Col. 16, line 42, kindly delete "$CpW(CO)_2CH_2$" and insert therefor -- $CpW(CO)_3CH_3$ --.

Col. 16, line 68, kindly delete "$Ph_1I^+$" and insert therefor -- $Ph_2I^+$ --.

Col. 17, line 7, kindly delete "$Ph_1I^+$" and insert therefor -- $Ph_2I^+$ --.

Col. 18, line 20, kindly delete "$CH_2Cl.$" and insert therefor $CH_2Cl_2$ --.

UNITED STATES PATENT AND TRADEMARK OFFICE
CERTIFICATE OF CORRECTION

PATENT NO. : 4,952,612

DATED : August 28, 1990

INVENTOR(S) : Katherine A. Brown-Wensley et al.

It is certified that error appears in the above-identified patent and that said Letters Patent is hereby corrected as shown below:

Col. 24, line 51, kindly add -- As can be seen from the NMR results, this system efficiently initiated both epoxy and free radical polymerization simultaneously. --

Col. 26, line 49, kindly delete "$Ph_2I{+}PF_6$" and insert therefor -- $Ph_2I{+}PF_6^-$ --.

Signed and Sealed this

Thirty-first Day of December, 1991

Attest:

HARRY F. MANBECK, JR.

Attesting Officer      Commissioner of Patents and Trademarks